United States Patent [19]

Schmidt

[11] 4,163,289

[45] Jul. 31, 1979

[54] SIXTEEN BIT MICROCOMPUTER MEMORY BOARDS FOR USE WITH EIGHT BIT STANDARD CONNECTOR BUS

[75] Inventor: Robert W. Schmidt, Stafford, Tex.

[73] Assignee: Texas Instruments Incorporated, Dallas, Tex.

[21] Appl. No.: 901,398

[22] Filed: May 1, 1978

[51] Int. Cl.² ............................................. G11C 13/00
[52] U.S. Cl. .................................... 365/51; 307/317 R
[58] Field of Search ................... 365/51, 175, 244, 73, 365/189; 307/224, 317 R

[56] References Cited

U.S. PATENT DOCUMENTS 4,056,811  1/1977  Baker ...................................... 365/73

Primary Examiner—Terrell W. Fears

Attorney, Agent, or Firm—John G. Graham

[57] ABSTRACT

A microcomputer system uses a standardized S-100 bus with eight bit Data In and eight bit Data Out lines, but has a sixteen bit microprocessor with sixteen bit bidirectional data input/output terminals. An arrangement of mirror image pairs of eight bit wide memory arrays on a single memory board are used, with means to cross-connect the Data In lines and Data Out lines for one memory array compared to another, these two memory arrays being accessed by the same address. A processor board containing the microprocessor chip connects the Data In and Data Out lines to the input/output terminals of the microprocessor by controllable unidirectional buffers which criss-cross the bytes on write compared to read operations.

8 Claims, 1 Drawing Figure

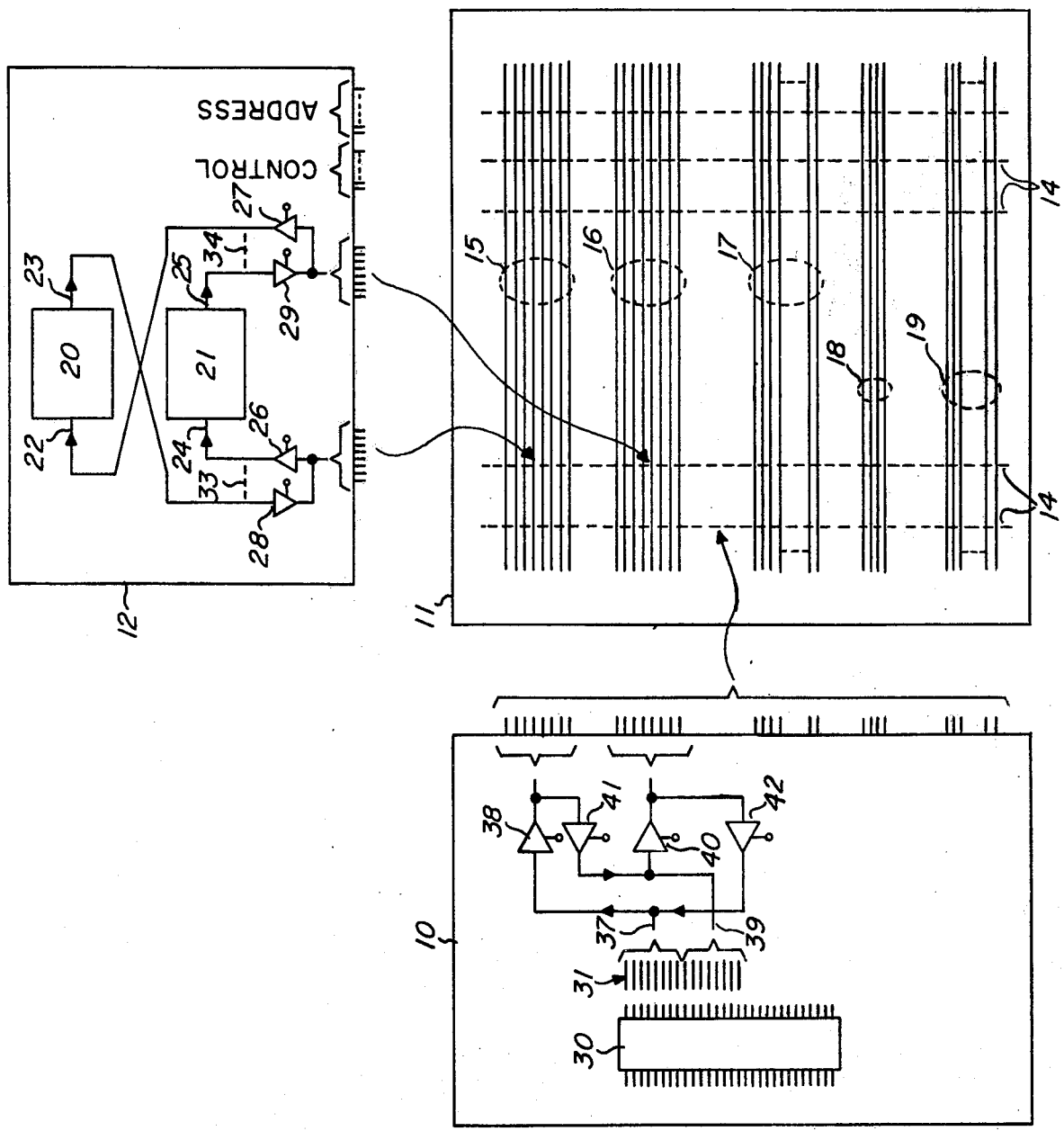

SIXTEEN BIT MICROCOMPUTER MEMORY BOARDS FOR USE WITH EIGHT BIT STANDARD CONNECTOR BUS

RELATED CASE

The subject matter of this application is related to that of my copending applications Ser. No. 898,735 and Ser. No. 898,736, filed Apr. 24, 1978 and assigned to Texas Instruments.

BACKGROUND OF THE INVENTION

This invention relates to microcomputer systems, and more particularly to the use of a sixteen bit microcomputer with standard eight bit bus arrangement and memory boards.

One of the most favorable factors in the development of the home or personal computer industry is de facto standardization of the bus arrangement used to connect one printed circuit board to another. This standard which is fairly widely accepted, is the "Altair" or "S-100" bus used in the original home computer kit, the Altair 8800. The S-100 bus contains one hundred conductors, many of which are not used or not assigned at present. Certain pins or conductors are designated for power supplies, clocks and ground, others for various interrupts and controls such as WAIT, INTERRUPT ACKNOWLEDGE, MEMORY WRITE, HOLD, etc. Sixteen pins are designated for the memory address, allowing 64K bytes of memory to be directly accessed. Separate unidirectional eight bit data pins are provided, eight Data In pins and eight Data Out pins. This bus system was built for the 8080 eight bit microprocessor, which is the most widely used at present, but it can be used with other eight bit microprocessor parts. Several manufacturers of microcomputers use the S-100 bus, and dozens of manufacturers of microcomputer boards use the S-100 to make hundreds of standard parts such as various types of memory boards as well as processor boards.

The Proceedings of the IEEE, Feb. 1978, p. 117, in an article entitled "Low-Cost Microcomputing: The Personal Computer and Single-Board Revolutions", states:

"The Altair 8800 and S100 Bus: The original MITS Altair 8800 kit . . . featured . . . 8080 central processing unit (CPU) . . . and a 100 line bus (known as the Altair or 'S100' bus). The bus allows expansion memory and peripherals to be connected. Expansion kits included additional memory, real-time clock, and vectored interrupt cards.

"The 100-line Altair bus has been widely copied. The bus data width is 8 bits, with separate lines for input and output. 65,536 bytes of memory may be addressed. Fourteen lines remain unused, and extensions have been proposed . . . Dozens of manufacturers offer Altair plug-compatible modules including READ-WRITE RAM, READ-ONLY memory (ROM) and combination RAM/ROM cards. Compatible EPROM programmers are available for the ultraviolet-Erasable, reProgrammable Read Only Memories (EPROM's) used for nonvolatile storage. S100 interface cards will drive black-and-white video displays, color video displays, magnetic cassette tape controllers, real-time clocks, and parallel and serial digital input/output (I/O). There are Altair-compatible controllers for flexible disks such as the mini-floppy (approximately 64K bytes), standard floppy (256K bytes), and even for Calcomp Trident hard disks (80 000K bytes). Besides digital-to-analog and analog-to-digital converters, there are S100-compatible speech and music synthesizers, modems for communication via telephones, video camera controllers, and kits for experimenting with speech recognition."

Sixteen bit microprocessors employ a sixteen bit bidirectional data bus which obviously is not directly compatible with the two eight bit unidirectional data bus sets in the S-100. A sixteen bit procesor of course uses a sixteen bit instruction board which is of many times more capability than an eight bit instruction word. Arithmetic operations can be performed in sixteen bit machines in from one third to one tenth the instruction words needed in eight bit machines. The cost of generating software is directly related to the number of statements or lines of code needed, so if the number of statements needed is halved, the cost is likewise halved. Further, sixteen bit processors often contain additional features such as more flexible addressing modes and more interrupt capability. The TMS9900 sixteen bit processor manufactured by the assignee hereof, Texas Instruments, has the added features of hardware multiply and divide instructions, multiple sets of sixteen general purpose registers and context switching which allows rapid interrupt response and user extension of the hardware instruction set. And so, many designers seek to employ sixteen bit procesors in place of the older but widely accepted eight bit processors.

Various interconnect arrangements have been proposed for interfacing a sixteen bit processor with the eight bit S-100 bus. Certainly, additional ones of the unused pins could be employed, producing two sixteen bit unidirectional buses. This would not be desirable because the system would not be compatible with the many available memory boards now on the market, and further a user could not use any of his existing boards if he wished to upgrade to a sixteen bit system. Compatibility can be achieved by forcing the sixteen bit processor to handle data input/output to the memory boards in eight bit bytes instead of sixteen bit words, but this sacrifices much of the advantage of using a sixteen bit processor in the first place. Hence each memory access is twice as long. See Journal of West Coast Computer Faire, Mar. 1978, p. 394–401, and BYTE Magazine, Mar. 1978, p. 148.

In my copending applications Ser. No. 898,735 and Ser. No. 898,736, filed Apr. 24, 1978, I have disclosed two arrangements for using the S100 bus with a sixteen bit processor. One requires a modification of part of the S100 motherboard, although standard eight bit memory boards may be used. The other requires a special mirror eight bit memory board paired with each standard eight bit memory board; here the motherboard is not modified. Each of these requires paired eight bit wide memory boards. It would be preferable in some cases to have full sixteen bit wide memory boards as this would save space and cost for a small system.

It is the principal object of this invention to provide a microcomputer system wherein the board-to-board connectors employ a standardized bus which has a word length of fewer bits than that of the data bus of the processor chip.

Another object is to provide an interconnection arrangement wherein a sixteen bit microprocessor can be used with existing eight bit memory boards having a standardized bus, particularly without sacrificing the speed inherent in a more powerful processor.

SUMMARY OF THE INVENTION

A microcomputer system uses a standardized S-100 bus with eight-bit Data In and eight-bit Data Out lines, but has a sixteen bit microprocessor with sixteen bit bidirectional data input terminals. An arangement is provided to cross-connect the Data In lines and Data Out lines for one eight bit wide memory array on a single board compared to another like array on the same board, these two memory arrays being accessed by the same address. A processor board containing the microprocessor connects the Data In and Data Out lines to the data input/output terminals by controllable unidirectional buffers which criss-cross the bytes on write compared to read operations.

BRIEF DESCRIPTION OF THE DRAWING

The novel features believed characteristic of the invention are set forth in the appended claims. The invention itself, however, as well as other features and advantages thereof, will be best understood by reference to the detailed description which follows, read in conjunction with the accompanying drawing, wherein:

The single FIGURE is an electrical diagram represented in block form showing a microcomputer system according to the invention.

DETAILED DESCRIPTION OF SPECIFIC EMBODIMENT

In a normal S-100 bus system operating with an 8080 processor, the data bus is two 8-bit unidirectional buses, Data In and Data Out. During a Write cycle eight bits of data are sent out from the processor on the Data Out lines, and the data is written into the appropriate eight memory cells at the byte selected by the address bus. When a Read cycle is performed the data is sent out from the memory board to the processor on the Data In bus. So, during any given Read or Write cycle only one bus is used, either Data In or Data Out, with eight lines being wasted. A single eight-bit bidirectional bus could have been used, since only one set of tristate devices is ever active on the bus at any one time. Data is written to the memory on one set of lines, and read back from memory on a different set of lines.

Referring now to the FIGURE, a modification of an S-100 bus system is illustrated to make use of the fact that the Data In or Data Out buses are not ever in use at the same time. The system includes a processor board 10, an S-100 motherboard or connector board 11, and a special sixteen bit memory board 12. The motherboard 11 is a printed circuit board with one hundred conductor lines or traces running parallel along its length, with a number of slots or connectors 14 into which are plugged the pins of the various boards such as the processor and memory boards, using conventional edge connectors. A typical size for small microcomputers is twelve of the slots 14. The traces include an eight bit Data Out bus 15 and an eight bit Data In bus 16, along with an address bus 17, power supply and clock lines 18, and a large number of control lines 19 and other lines not pertinent to this invention. To provide sixteen bit operation, a special memory card 12 is plugged into one of the slots 14. The card 12 is set to select for a given address space. This modification of one memory board by transposing certain unidirectional buffers is all that is required to provide a sixteen bit wide memory used with an S-100 board in a sixteen bit system.

The memory board 12 has two identical eight bit wide memory arrays 20 and 21. The array 20 has an input 22 and an output 23, while the array 21 likewise has an input 24 and an output 25. Often arrays such as this would have bidirectional input/output ports, but separate input and output ports are shown. Eight controllable unidirectional buffers 26 connect the input 24 to the pins on the board 12 which are plugged into the Data Out lines 15, and eight buffers 27 connect the inputs 21 to the pins going to the Data In lines 16. In like manner, the outputs 23 and 25 are connected to pins on the board 12 going to the lines 15 and 16 via sets of eight controllable unidirectional buffers 28 and 29.

If the CPU chip 30 puts a write command on control lines 19 of the bus, and drives sixteen bits of data on to the bidirectional data output pins 31 on the chip and thus to appropriate pins on the board 10, then each of the arrays 20 and 21 on the memory card 12 will store one of the bytes of data. The unidirectional buffers 26 in each of the eight Data In lines on the memory card 12 will allow the data on the lines 15 to be applied to the inputs 24 of the memory chips in the array 29 of memory devices on the board 12. Likewise, unidirectional buffers 27 on the board 12 allow the data from lines 16 to be applied to the data input lines 22 in the array 20 of memory chip. The unidirectional buffers 26 and 27 would be actuated to allow data on the bus 15 and bus 16 to be applied to the inputs 24 and 21 only when a WRITE command is applied to the control lines 19 of the bus, along with board select or chip select when a large number of memory boards or chips is used. For a Read operation, the output 25 of the array 21 on the board 12 is connected by eight unidirectional buffers 29 to the Data In lines 16, while the output 23 from the other memory array 20 is connected by eight unidirectional buffers 28 to the Data Out lines 15. The sets of unidirectional buffers 28 and 29 are controlled by a READ command on control lines 19, as well as board or chip select. Thus, if the CPU 20 puts a WRITE command on the control lines 19 and drives sixteen bits of data onto the bus lines 15 and 16, each of the memories 20 and 21 will store one of the bytes of data. But when a READ cycle is performed by putting a READ command on the lines 19 and activating unidirectional buffers 28 and 29, the data will return on the opposite bus lines. Conceivably this byte swap could be reconciled by the CPU by appropriate programming, but as a practical matter it must be eliminated so that the operation of the system will be faster. The unidirectional buffers ordinarily used on the processor card are wired slightly differently to eliminate the byte swap. For WRITE, the high order byte is connected by eight lines 37 and eight controllable unidirectional buffers 38 to the pins going to the lines 15, and likewise the low order byte is connected by eight lines 39 and eight controllable unidirectional buffers 40 to pins going to the bus lines 16. For READ, the pins for the bus 15 are connected by eight unidirectional buffers 41 to the lines 39, rather than the lines 37 as in conventional sixteen bit processor boards. Likewise, the pins for the bus 16 are connected by eight unidirectional buffers 42 to the lines 37. This transpostion or criss-cross eliminates the byte swap. The unidirectional buffers 38, 40, 41 and 42 are controlled by WRITE and READ commands from the CPU 30 in conventional manner.

The available board space on an S-100 card is relatively small, about 5×7 inches, so any way of reducing the number of chips required to implement the criss-cross buffer system of the invention is of considerable advantage. The package count can be reduced by using a standard unidirectional buffer device which has an eight bit parallel input and an eight bit parallel output, with inputs and outputs tied together on each side. This device is commercially available under the part number 74LS245 from semiconductor manufacturers. A short at the points 33 and 34 on the board 12 will not affect operation if the memory arrays have separate input and output ports, because the data write buffers 26 and 27 would never be enabled at the same time as the array outputs 23 and 25.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A microcomputer comprising: a processor board containing a microprocessor having sixteen bit bidirectional data terminals; a sixteen bit memory board containing separate eight bit unidirectional Data In and Data Out lines; a connector board containing a standardized bus with a plurality of plug-in connectors to receive the processor board and memory boards, the connector board having separate eight bit Data In and Data Out lines for connection to said lines on the memory boards; unidirectional means on the memory board to connect the eight bit Data In and Data Out lines to two separate memory arrays on the memory board, the unidirectional means being connected in opposite direction for one of the memory arrays relative to the other; and connecting means on the processor board to connect the sixteen bit bidirectional data terminals to the two separate eight bit Data In and Data Out lines of the connector board.

2. A microcomputer according to claim 1 wherein the unidirectional means comprises buffers for the memory board which connect the eight bit Data In lines to the input of one memory array and which connect the eight bit Data Out lines to the output of said one memory array on such board, and comprises buffers for the other memory array which connect the eight bit Data Out lines to the input of the other memory array and which connect the eight bit Data In lines to the input of the said other memory array.

3. A microcomputer according to claim 2 wherein the unidirectional Data In and Data Out lines on said connector board coupled by the connecting means on the procesor board to the sixteen bit directional data terminals via controllable unidirectional buffers which cross-connect the Data In and Data Out connections for read and write operations.

4. A microcomputer according to claim 3 wherein the connector board contains a standardized S-100 bus.

5. A microcomputer according to claim 1 wherein said one memory array is accessed by the same address as said other memory array.

6. A connection arrangement for a memory board for a microcomputer system of the type having a standardized bus on a connector board with N Data In lines and N Data Out lines for connection to a processor board having a 2 N bit microprocessor, where N is an integral power of two, comprising unidirectional coupling means on the memory board for connecting the Data In lines to the input of one part of the memory and for connecting the Data Out lines to the output of said one part of the memory, and unidirectional coupling means for connecting the Data In lines to the output of another part of the memory and for connecting the Data Out lines to the input of said another part of the memory.

7. A connecting arrangement according to claim 6 wherein there are eight parallel conductors for Data In and eight parallel conductors for Data Out.

8. A connection arrangement according to claim 7 wherein the parallel conductors are designated for standard uses in accordance with the S-100 standard bus arrangement.

* * * * *